(12) United States Patent
Ookubo et al.

(10) Patent No.: US 7,137,380 B1
(45) Date of Patent: Nov. 21, 2006

(54) INTERNAL COMBUSTION ENGINE WITH IGNITION PLUG AND VEHICLE PROVIDED WITH THE SAME

(75) Inventors: Akihiko Ookubo, Shizuoka (JP); Yorio Futakuchi, Shizuoka (JP); Hideaki Kawabe, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/197,891

(22) Filed: Aug. 5, 2005

(51) Int. Cl.
*F02B 31/04* (2006.01)

(52) U.S. Cl. .................. 123/306; 123/188.14; 123/308

(58) Field of Classification Search .......... 123/188.14, 123/301, 302, 306, 308
See application file for complete search history.

(56) References Cited

U.S. PATENT DOCUMENTS

| | | | | |
|---|---|---|---|---|
| 5,027,761 A | | 7/1991 | Fujii et al. | |
| 5,394,845 A | * | 3/1995 | Noh et al. | 123/308 |
| 5,529,038 A | * | 6/1996 | Tsuchida | 123/308 |
| 5,720,255 A | * | 2/1998 | Yoshikawa | 123/308 |
| 5,913,297 A | * | 6/1999 | Jingu | 123/308 |
| 6,276,330 B1 | * | 8/2001 | Adamisin et al. | 123/308 |
| 6,655,347 B1 | * | 12/2003 | Takamiya et al. | 123/306 |

* cited by examiner

*Primary Examiner*—T. M. Argenbright
(74) *Attorney, Agent, or Firm*—Keating & Bennett, LLP

(57) ABSTRACT

An internal combustion engine includes a cylinder having a cylinder inner surface, a cylinder head that cooperates with the cylinder inner surface to define a combustion chamber and has a head inner surface including an intake opening through which an intake gas is introduced into the combustion chamber, an intake valve that opens and closes the intake opening, an ignition plug provided on the cylinder head, and an intake drifting mechanism that causes the intake gas to drift toward an axis of the cylinder in the intake opening and generates a vortex flow in the combustion chamber. When the intake valve is opened, a minimum gap between the intake valve and the head inner surface is equal to or larger than a gap between the intake valve and the cylinder inner surface in a diametrical direction of the cylinder.

10 Claims, 8 Drawing Sheets

INTERNAL COMBUSTION ENGINE WITH IGNITION PLUG AND VEHICLE PROVIDED WITH THE SAME

BACKGROUND OF THE INVENTION

1. Field of the Invention

The present invention relates to an internal combustion engine with an ignition plug and a vehicle provided with the same.

2. Description of the Related Art

In spark ignition type internal combustion engines having an intake opening for suction of an air-fuel mixture and an exhaust opening for exhaust of combustion gases, it has been conventionally thought to be preferable to arrange an ignition plug around a center of a combustion chamber, that is, in the vicinity of a cylinder axis in order to improve the anti-knock property. Actually, however, parts other than an ignition plug are provided in an internal combustion engine, and an adequate anti-knock property cannot necessarily be obtained only by simply arranging an ignition plug in the vicinity of a cylinder axis while neglecting the layout of these other parts. It has been proposed to arrange an ignition plug to be offset toward an intake opening from a cylinder axis (see, for example, FIG. 7 of U.S. Pat. No. 5,027,761).

When an ignition plug is arranged offset toward an intake opening as in U.S. Pat. No. 5,027,761, a space on a side of the intake opening becomes smaller than the ignition plug on a cylinder head. As a result, when the amount of offset of the ignition plug toward the intake opening is large, the amount of open area of the intake opening must be decreased. When the open area of the intake opening is increased, however, a decrease in intake quantity is caused, so that a reduction in engine output occurs.

SUMMARY OF THE INVENTION

In order to overcome the problems described above, preferred embodiments of the present invention provide an internal combustion engine that achieves a significant improvement in anti-knock property while preventing reduction in engine output.

According to a preferred embodiment of the present invention, an internal combustion engine includes a cylinder having a cylinder inner surface, a cylinder head that cooperates with the cylinder inner surface to define a combustion chamber and has a head inner surface including an intake opening through which an intake gas is introduced into the combustion chamber, an intake valve that opens and closes the intake opening, an ignition plug provided on the cylinder head, and an intake drifting mechanism that causes the intake gas to drift toward an axis of the cylinder in the intake opening and generates a vortex flow in the combustion chamber, wherein when the intake valve is opened, a minimum gap between the intake valve and the head inner surface is equal to or larger than a gap between the intake valve and the cylinder inner surface in a diametrical direction of the cylinder.

According to another preferred embodiment of the present invention, an internal combustion engine includes a cylinder having a cylinder inner surface, a cylinder head that cooperates with the cylinder inner surface to define a combustion chamber and has a head inner surface including an intake opening through which an intake gas is introduced into the combustion chamber, an intake valve that opens and closes the intake opening, an ignition plug provided on the cylinder head, and an intake drifting mechanism that causes the intake gas to drift toward an axis of the cylinder in the intake opening and generates a vortex flow in the combustion chamber, wherein the ignition plug is arranged at a position that is within about 5% of a bore diameter of the cylinder from the axis of the cylinder.

With the internal combustion engine according to a preferred embodiment of the present invention, the intake drifting mechanism enables an intake gas to be positively introduced into the combustion chamber from a side of the cylinder axis. Therefore, a sufficient intake quantity can be reliably ensured even when the ignition plug is less offset. Since the ignition plug can be less offset, ignition occur in the vicinity of the cylinder axis. Accordingly, synergistic effects of drift of an intake gas, vortex flows in the combustion chamber, and ignition in the vicinity of the cylinder axis make it possible to improve the anti-knock property while preventing reduction in engine output.

Other features, elements, characteristics and advantages of the present invention will be apparent from the following detailed description of preferred embodiments with reference to the attached drawings.

DETAILED DESCRIPTION OF PREFERRED EMBODIMENTS

Figure 1:
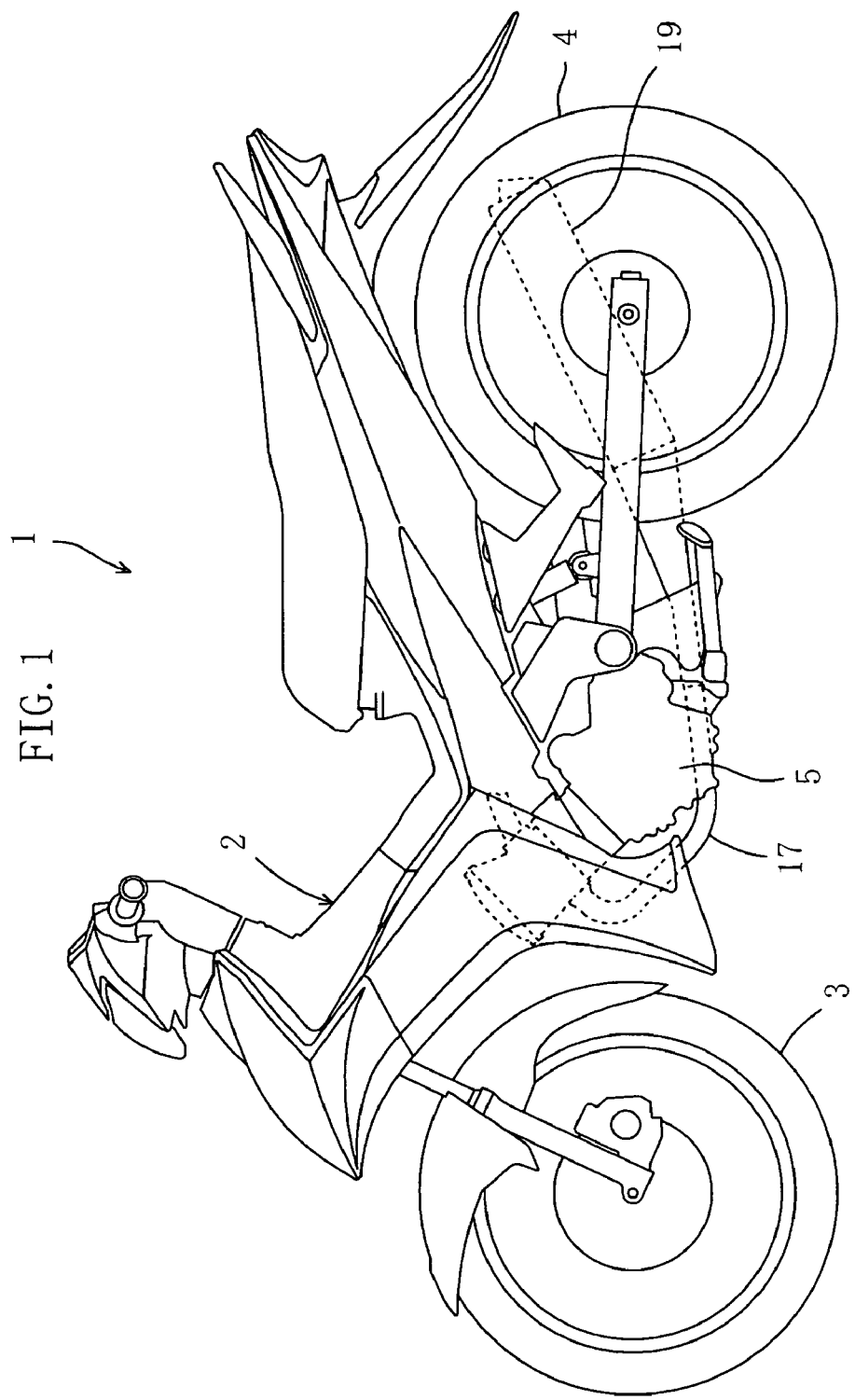
FIG. 1 is a side view showing a motorcycle.

As shown in FIG. 1, a vehicle according to a preferred embodiment is a motorcycle 1. However, vehicles according to preferred embodiments of the present invention are not limited to the motorcycle 1. A vehicle according to the present invention may be other saddle-ride type vehicles or other vehicles that are not saddle-ride type vehicles. In addition, "motorcycle" includes scooters, etc. in addition to so-called motorbikes.

The motorcycle 1 includes a vehicle body 2, a front wheel 3 and a rear wheel 4, which are mounted to the vehicle body 2, and an engine 5 that drives the rear wheel 4 through a drive chain (not shown). In the present preferred embodiment, the engine 5 preferably includes a single-cylinder 4-cycle internal combustion engine. However, the engine 5 is not limited in the number of cylinders, etc.

Figure 2:
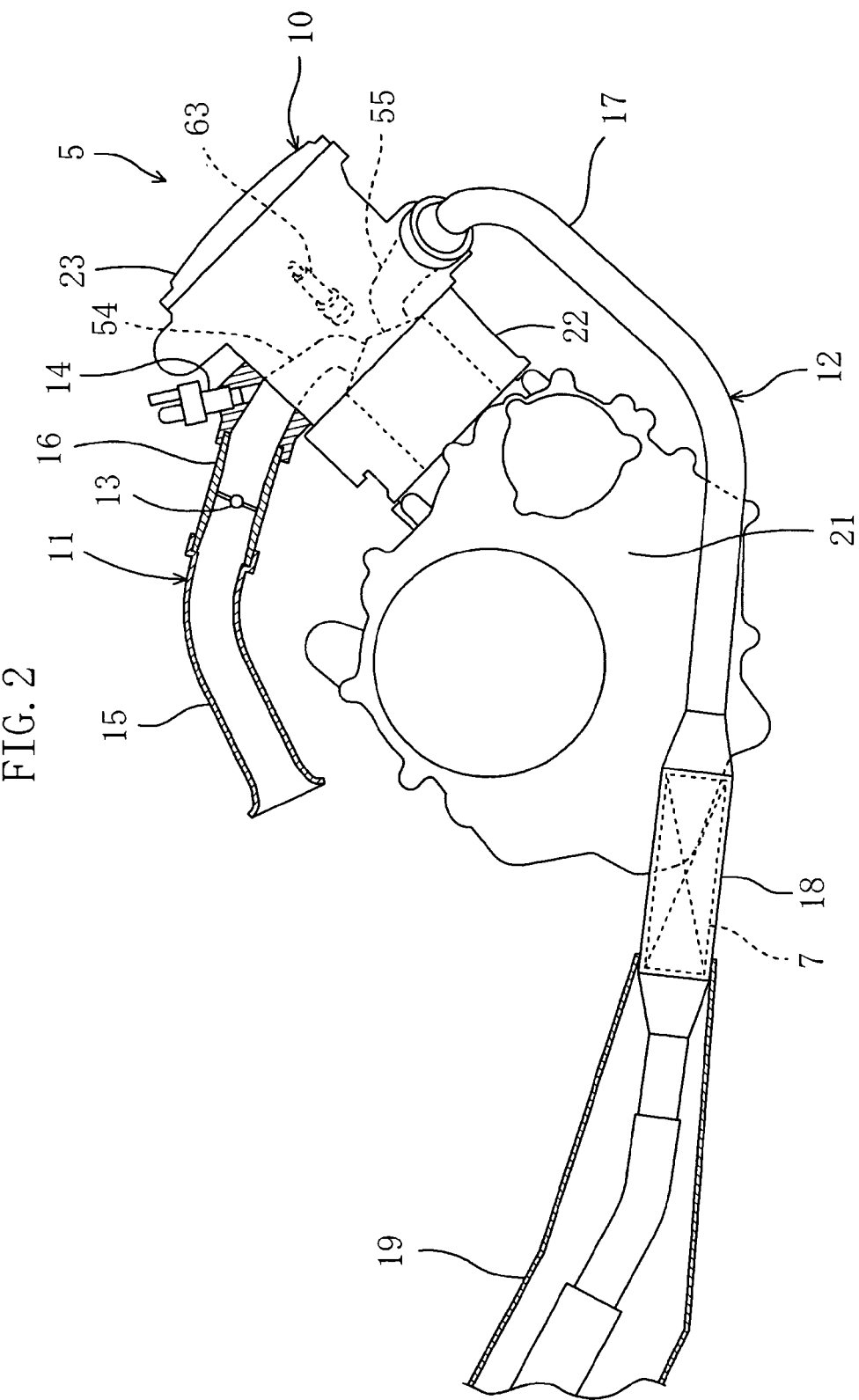
FIG. 2 is a view showing the construction of an engine.

As shown in FIG. 2, the engine 5 includes an engine body 10, an intake passage 11, and an exhaust passage 12. The engine body 10 includes a crankcase 21, in which a crankshaft 42 (see FIG. 3) or the like is accommodated, a cylinder 22 unified with the crankcase 21, and a cylinder head 23 mounted to the cylinder 22. In addition, according to the present preferred embodiment, the crankcase 21 and the cylinder 22 are unified together to form a cylinder block.

However, the crankcase 21 and the cylinder 22 may be formed separately and assembled with each other.

The intake passage 11 includes an intake pipe 15 connected to an air cleaner (not shown), a throttle body 16, and an intake port 54 formed in the cylinder head 23. A downstream end of the intake pipe 15 is connected to an upstream end of the throttle body 16, and a downstream end of the throttle body 16 is connected to the cylinder head 23. A throttle valve 13 is provided within the throttle body 16. An injector 14 is mounted to the cylinder head 23. That is, the injector 14 is arranged in the intake passage 11 downstream of the throttle valve 13. Accordingly, the injector 14 injects a fuel between the throttle valve 13 and an intake opening 52 (see FIG. 3) described later.

The exhaust passage 12 includes an exhaust port 55 located on the cylinder head 23, an exhaust pipe 17 connected to the cylinder head 23, a catalyst casing 18 provided on the exhaust pipe 17, and a muffler 19 provided at a tip end of the exhaust pipe 17. A ternary catalyst 7 is accommodated within the catalyst casing 18.

Figure 3:
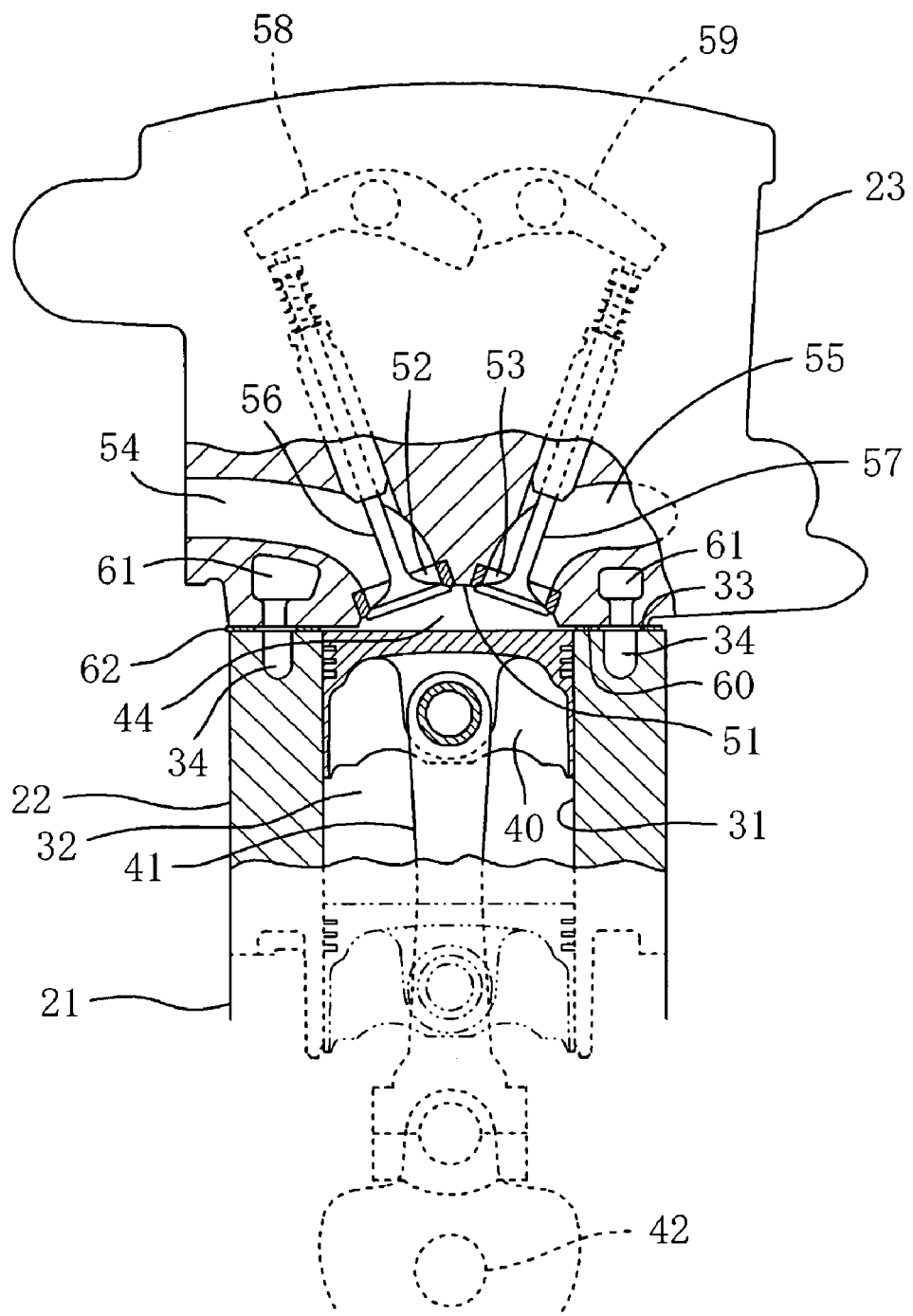
FIG. 3 is a cross sectional view showing an essential part of the engine.

As shown in FIG. 3, a cylinder inner surface 31 defines a columnar-shaped cylinder chamber 32 inside the cylinder 22, and a piston 40 is accommodated in the cylinder chamber 32. The piston 40 is connected to a connecting rod 41, and the connecting rod 41 is connected to the crankshaft 42. A water jacket 34 is formed on an upper surface of the cylinder 22, that is, an opposed surface 33 opposed to the cylinder head 23. The water jacket 34 is arranged so as to surround a periphery of the cylinder chamber 32 as viewed in a longitudinal direction (a vertical direction in FIG. 3) of the cylinder 22.

A pent roof type recess 51 that covers the area above the cylinder chamber 32 is disposed on a lower surface of the cylinder head 23, that is, a head inner surface 60. However, the recess 51 is not limited in shape but may be, for example, semi-spherical or multi-spherical in shape. A combustion chamber 44 is defined by the recess 51, the cylinder inner surface 31, and an upper surface of the piston 40.

Figure 4:
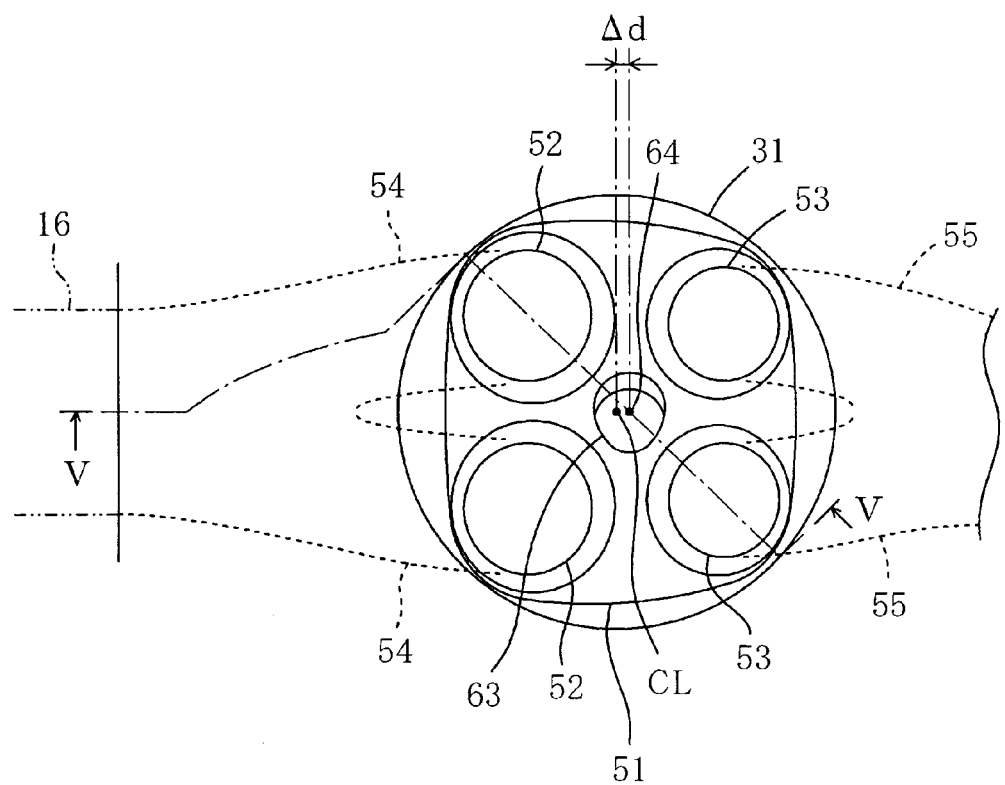
FIG. 4 is a bottom view showing a cylinder head.

As shown in FIG. 4, the recess 51 preferably includes two intake openings 52 and two exhaust openings 53. The intake openings 52 are preferably formed on a rear side (a left side in FIG. 4) of the vehicle body 2 to be arranged in a right and left direction (a vertical direction in FIG. 4) of the vehicle body 2. The exhaust openings 53 are preferably formed on a front side (a right side in FIG. 4) of the vehicle body 2 to be arranged in the right and left direction of the vehicle body 2. The intake openings 52 and the exhaust openings 53 are arranged to be offset from a cylinder axis CL, and arranged so as to surround the cylinder axis CL. In addition, the intake openings 52 preferably have a larger open area than the exhaust openings 53.

As shown in FIG. 3, the cylinder head 23 is formed with intake ports 54 that are in communication with the combustion chamber 44 through the respective intake openings 52, and exhaust ports 55 that are communicated to the combustion chamber 44 through the respective exhaust openings 53. As shown in FIG. 4, the intake ports 54 join together to be in communication with the throttle body 16. Also, both exhaust ports 55 join together to be in communication with the exhaust pipe 17.

As shown in FIG. 3, the cylinder head 23 is provided with intake valves 56 that open and close the intake openings 52, and exhaust valves 57 that open and close the exhaust openings 53. The intake valves 56 and the exhaust valves 57, respectively, are biased in directions in which the intake openings 52 and the exhaust openings 53 are closed. Also, the cylinder head 23 is provided with rocker arms 58, 59 that periodically open and close the intake valves 56 and the exhaust valves 57. However, a valve operating mechanism that opens and closes the intake valves 56 and the exhaust valves 57 is in no way limiting.

A water jacket 61 is formed on an inner surface 60 of the cylinder head 23. The water jacket 61 is located at a position corresponding to the water jacket 34 in the cylinder 22. A gasket 62 is interposed between the cylinder head 23 and the cylinder 22. The gasket 62 preferably includes a plurality of holes (not shown) that provide communication between the water jacket 61 in the cylinder head 23 and the water jacket 34 in the cylinder 22.

Figure 5:
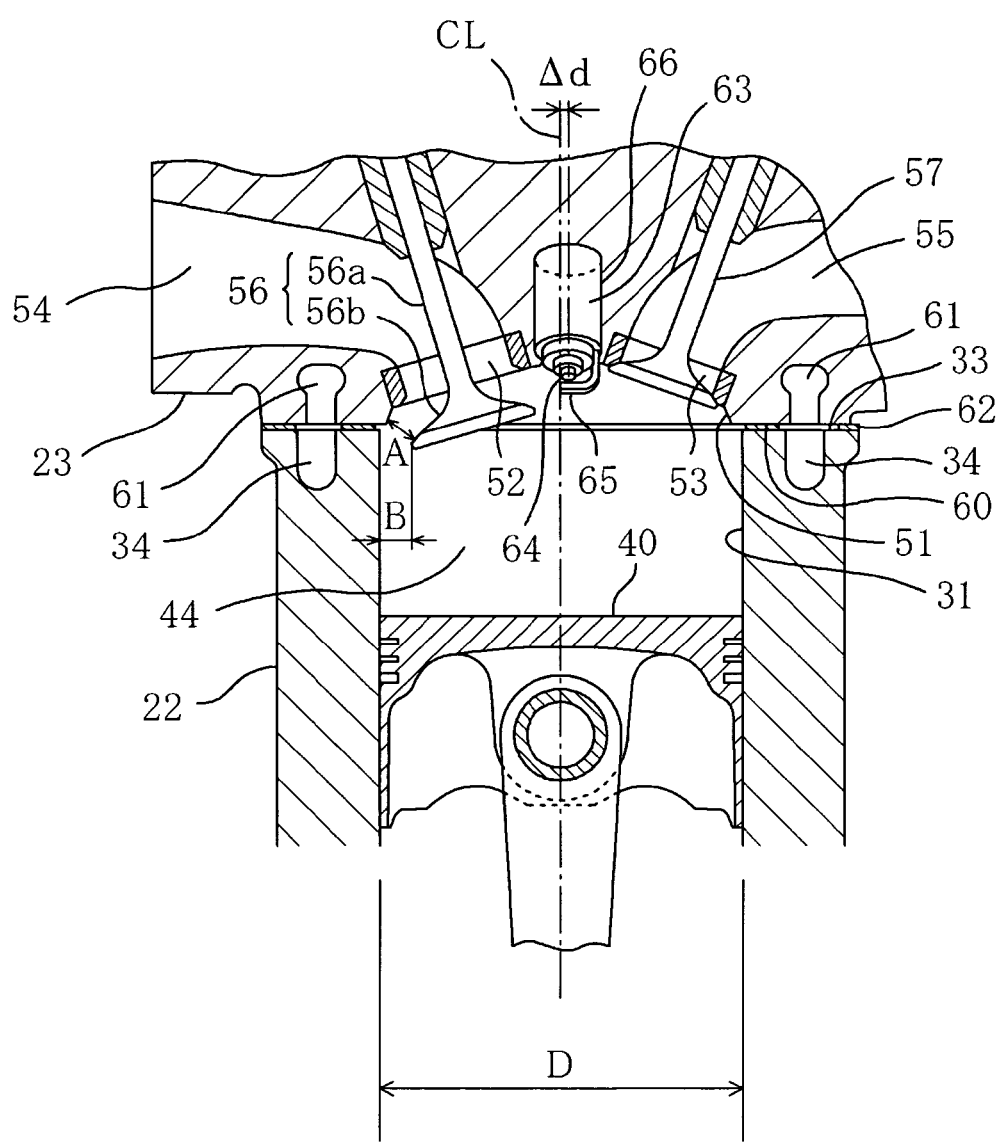
FIG. 5 is a cross sectional view taken along the line V—V in FIG. 4.

As shown in FIG. 5, the intake ports 54 preferably include a so-called tumble port. More specifically, the intake ports 54 make flow passages that cause an air-fuel mixture, which is introduced into the combustion chamber 44 through the intake openings 52, to generate vertical vortex flows (tumble flows) in the combustion chamber 44. Also, the intake ports 54 are formed so as to have the air-fuel mixture drifting toward the cylinder axis CL in the intake openings 52. Here, as compared with the exhaust ports 55, the intake ports 54 are formed to be relatively straight in regions (upstream regions) distant from the combustion chamber 44 and curved relatively acutely in regions (downstream regions) near to the combustion chamber 44.

However, the intake ports 54 in the present preferred embodiment have flow passages that have the air-fuel mixture drifting toward the cylinder axis CL and are liable to generate vortex flows in the combustion chamber 44, and the intake ports 54 are not limited in specific configuration. The intake ports 54 may have flow passages that form transverse vortex flows, that is, swirl flows within the combustion chamber 44.

In addition, "cylinder axis CL" herein means a region except the vicinity of the cylinder inner surface 31 and means a relatively wide region. Accordingly, with, for example, the upwardly left intake opening 52 in FIG. 4, "drifting toward the cylinder axis CL" referred to herein includes not only having the air-fuel mixture drifting rightward and obliquely downward in FIG. 4, but also having the air-fuel mixture drifting rightward (toward the exhaust opening 53) and having the air-fuel mixture drifting downward (toward the other intake opening 52).

As shown in FIG. 5, the intake valves 56 include a shaft 56*a* and an umbrella portion 56*b* provided at a tip end of the shaft 56*a*. The exhaust valves 57 preferably have substantially the same construction as the intake valves 56.

As shown in FIG. 5, when the intake valves 56 are opened, gaps are formed between the recess 51 of the cylinder head 23 and the intake valves 56 (more specifically, the umbrella portions 56*b* of the intake valves 56). The air-fuel mixture flows into the combustion chamber 44 through the gaps from the intake ports 54. While the gaps are preferably provided all around the umbrella portions 56*b* of the intake valves 56, the gaps become smallest in the vicinity of the cylinder inner surface 31.

In the present preferred embodiment, when the intake valves 56 are opened, minimum gaps A between the intake valves 56 and the recess 51 become equal to or larger than gaps B (in other words, gaps between the intake valves 56 and the cylinder inner surface 31 as viewed in an axial direction of the cylinder) between the intake valves 56 and the cylinder inner surface 31 in a diametrical direction (that is, a diametrical direction of the cylinder 22) of the combustion chamber 44. In this manner, according to the present preferred embodiment, the intake valves 56 are provided in positions close to the cylinder inner surface 31 and the intake openings 52 are formed in positions close to the cylinder inner surface 31, as viewed in the axial direction of the cylinder. An excess space corresponding to amounts by which the intake valves 56 and the intake openings 52 are close to the cylinder inner surface 31, is produced in a central region of the recess 51 of the cylinder head 23. In addition, while values of the gaps A and the gaps B are not specifically limiting, the gaps may be, for example, about 2 mm to about 5 mm. The gaps A and the gaps B may also be about 3 mm to about 4 mm, for example.

The cylinder head 23 is provided with an ignition plug 63. The ignition plug 63 includes a plug body 66, a central electrode 64 provided at a tip end of the plug body 66, and a lateral electrode 65. The central electrode 64 and the lateral electrode 65 project toward the combustion chamber 44 from the recess 51 of the cylinder head 23. The ignition plug 63 is preferably located at a position that is offset toward the exhaust openings 53 from the cylinder axis CL. More specifically, the central electrode 64 of the ignition plug 63 is offset toward the exhaust openings 53 from the cylinder axis CL.

As described above, the intake openings 52 are formed in positions close to the cylinder inner surface 31. Therefore, as compared with conventional engines, it is possible in the engine 5 to make a position of the ignition plug 63 offset toward the intake openings 52 by amounts, by which the intake openings 52 are offset toward the cylinder inner surface 31. Therefore, it is possible to make a position of the ignition plug 63 approach the cylinder axis CL.

An offset Δd of the ignition plug 63 from the cylinder axis CL is preferably within about 5% of a bore diameter D of the cylinder 22, and especially preferably within about 3%. The bore diameter D may be, for example, about 50 mm to about 60 mm. The offset Δd is less than, for example, about 3 mm and may be equal to or less than about 1.5 mm. Also, the offset Δd may be about 1 mm to about 2 mm. By making the offset Δd small, generation of knocking can be effectively prevented even in combustion in, for example, a theoretical air-fuel ratio or in a lean region. In addition, the offset Δd may be 0. That is, the ignition plug 63 may be arranged on the cylinder axis CL.

Figure 6:
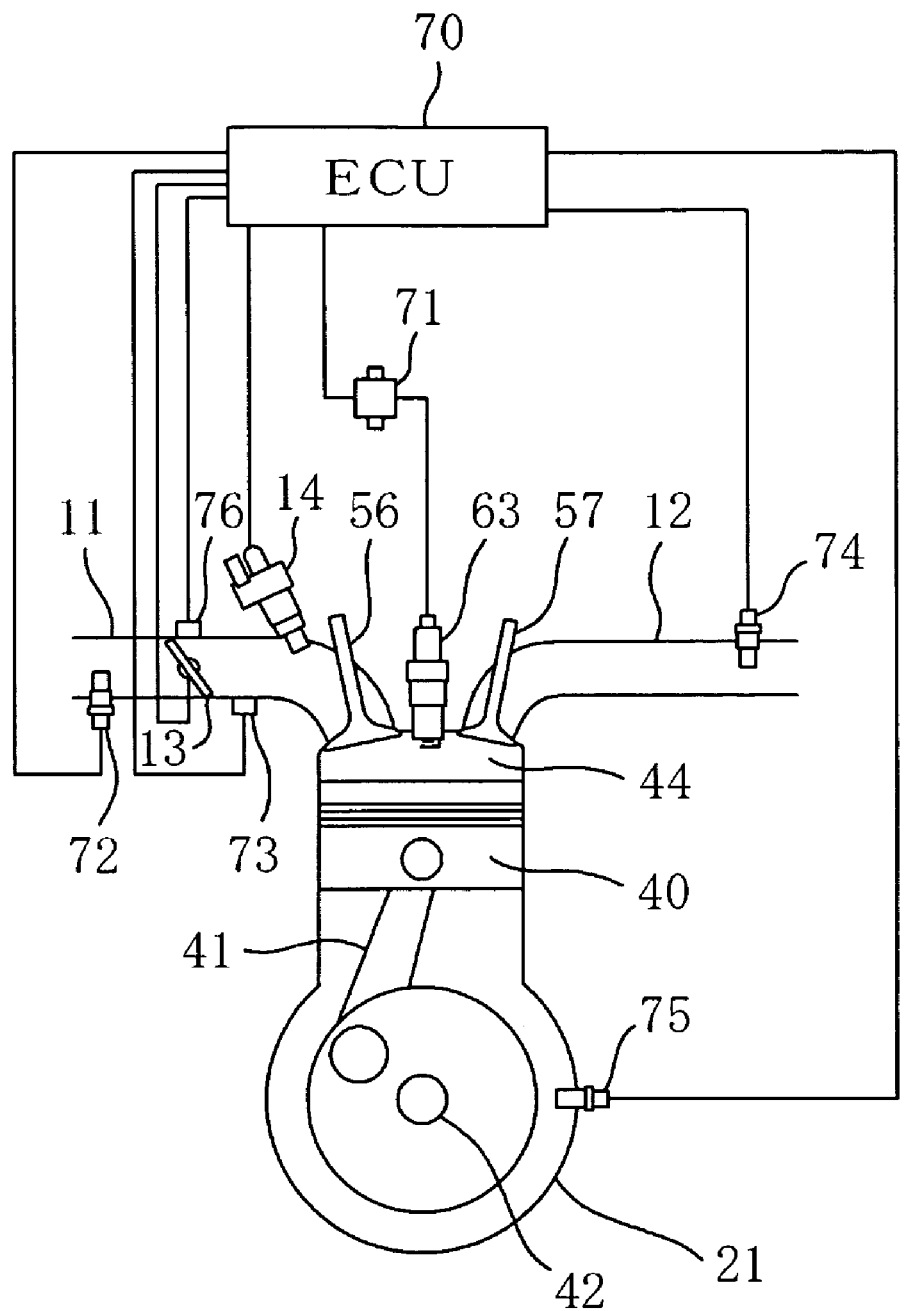
FIG. 6 is a view showing the construction of a control device for the engine.

As shown in FIG. 6, a temperature sensor 72 that detects a temperature in the intake passage 11, a pressure sensor 73 that detects a pressure in the intake passage 11, and a throttle position sensor 76 that detects the opening degree of the throttle valve 13, are provided in the intake passage 11 of the engine 5. In addition, the pressure sensor 73 is provided downstream of the throttle valve 13. An $O_2$ sensor 74 is provided in the exhaust passage 12. The crankcase 21 is provided with a crank angle sensor 75 that detects a crank angle. The sensors 72 to 76 are connected to an engine control unit (ECU) 70. In addition, the ECU 70 is connected to the ignition plug 63 through an ignition coil 71 to control the ignition timing of the ignition plug 63. Also, the ECU 70 is also connected to the injector 14 to control the fuel injection timing of the injector 14.

The ECU 70 controls the throttle valve 13 or the injector 14 so that an air-fuel ratio amounts to about 14.7 (theoretical air-fuel ratio) not only during steady driving but also during the operation in a region of low-speed rotation such as idling or the like. For example, the ECU 70 adjusts an intake quantity or a fuel injection quantity to thereby control the air-fuel ratio at the time of idling operation to make the same about 14.2 to about 15.2. In this manner, by making the air-fuel ratio substantially equal to the theoretical air-fuel ratio, it is possible to make effective use of the ternary catalyst 7 in the exhaust passage 12 also at the time of idling operation.

As described above, with the engine 5, the intake openings 52 are close to the cylinder inner surface 31, and the gaps B between the intake valves 56 and the cylinder inner surface 31 as viewed in the axial direction of the cylinder are equal to or smaller than the minimum gaps A between the intake valves 56 and the recess 51 of the cylinder head 23. Therefore, the air-fuel mixture becomes hard to flow on sides of the intake openings 52 toward the cylinder inner surface 31 as compared with a side toward the cylinder axis CL. However, the intake ports 54 are formed so as to have the air-fuel mixture drifting toward the cylinder axis CL. Therefore, a decrease in sucked quantity on sides of the intake openings 52 toward the cylinder inner surface 31 can be compensated for by an increase in sucked quantity on sides toward the cylinder axis CL. Accordingly, it is possible to supply a sufficient quantity of the air-fuel mixture to the combustion chamber 44.

Also, since the air-fuel mixture forms vortex flows in the combustion chamber 44, even the air-fuel mixture that flows from sides of the intake openings 52 toward the cylinder axis CL becomes liable to flow to the vicinity of the cylinder inner surface 31 after flowing into the combustion chamber 44. Accordingly, the air-fuel mixture is filled relatively evenly in the combustion chamber 44. In this manner, with the engine 5, there is a fear that dispersion in flow distribution is generated in the intake openings 52 attendant on drifting of the air-fuel mixture but such dispersion can be dissolved in the combustion chamber 44.

On the other hand, it is possible in the engine 5 to arrange the ignition plug 63 in the vicinity of the cylinder axis CL by amounts by which the intake openings 52 are close to the cylinder inner surface 31. Therefore, it is possible to prevent dispersion in a propagation distance of a combustion flame in the combustion chamber 44, so that it is possible to achieve an improvement in anti-knock property.

In this manner, with the engine 5, the air-fuel mixture flowing into the combustion chamber 44 is caused to drift toward the cylinder axis CL in the intake openings 52, vortex flows are formed in the combustion chamber 44, and the ignition plug 63 is caused to generate ignition in the vicinity of the cylinder axis CL, so that synergistic effects thereof make it possible to achieve an improvement in the anti-knock property while preventing reduction in engine output.

With the engine 5, the operation at the theoretical air-fuel ratio can be stably performed even in a region of low-speed rotation. Of course, the idling operation at the theoretical air-fuel ratio can also be stably performed. Also, the idling operation in a lean region is also possible.

Also, with the engine 5, an improvement in anti-knock property is achieved, so that it is possible to increase the compression ratio.

With the engine 5, the intake ports 54 include a tumble port. Accordingly, a relatively simple construction makes it possible to form tumble flows in the combustion chamber 44 without incurring any increase in the number of parts.

As described above, with the engine 5, a position of the ignition plug 63 is offset from the cylinder axis CL and especially offset toward the exhaust openings 53. Therefore, the open area of the intake openings 52 can be increased as compared with the case where the ignition plug 63 is offset toward the intake openings 52. However, according to the number and arrangement of the intake openings 52 and the exhaust openings 53, an open area of the intake openings 52 can be ensured sufficiently even when the ignition plug 63 is offset toward the intake openings 52. In such case, the ignition plug 63 may be offset toward the intake openings 52.

As described above, the intake ports 54 in the present preferred embodiment preferably include a tumble port. However, the intake ports 54 may be the type that have the air-fuel mixture drifting toward the cylinder axis CL and that generate vortex flows in the combustion chamber 44. The intake ports 54 may include swirl ports to generate transverse vortex flows within the combustion chamber 44. The intake ports 54 may have the air-fuel mixture introduced in a direction tangent to the cylinder inner surface 31 of the combustion chamber 44.

Also, it is not required that the intake drifting mechanism be constituted only by the intake ports 54. The intake drifting mechanism is not limited in specific constitution. For example, the intake drifting mechanism may include a closure member (for example, a projection) that partially plugs a flow passage in the intake port 54. Also, the intake drifting mechanism may include a separate flow passage from the intake ports 54, from which flow passage a jet flow has the air-fuel mixture in the intake ports 54 drifting or the like.

Also, the intake drifting mechanism may include a valve to have the air-fuel mixture drifting, for example, a valve that partially plugs a flow passage in the intake port 54. The intake drifting mechanism may include a control valve or a throttle valve described in, for example, the specification and drawings of U.S. Pat. No. 5,359,972. Contents of the specification and drawings of U.S. Pat. No. 5,359,972 are incorporated by reference herein.

Figure 7:
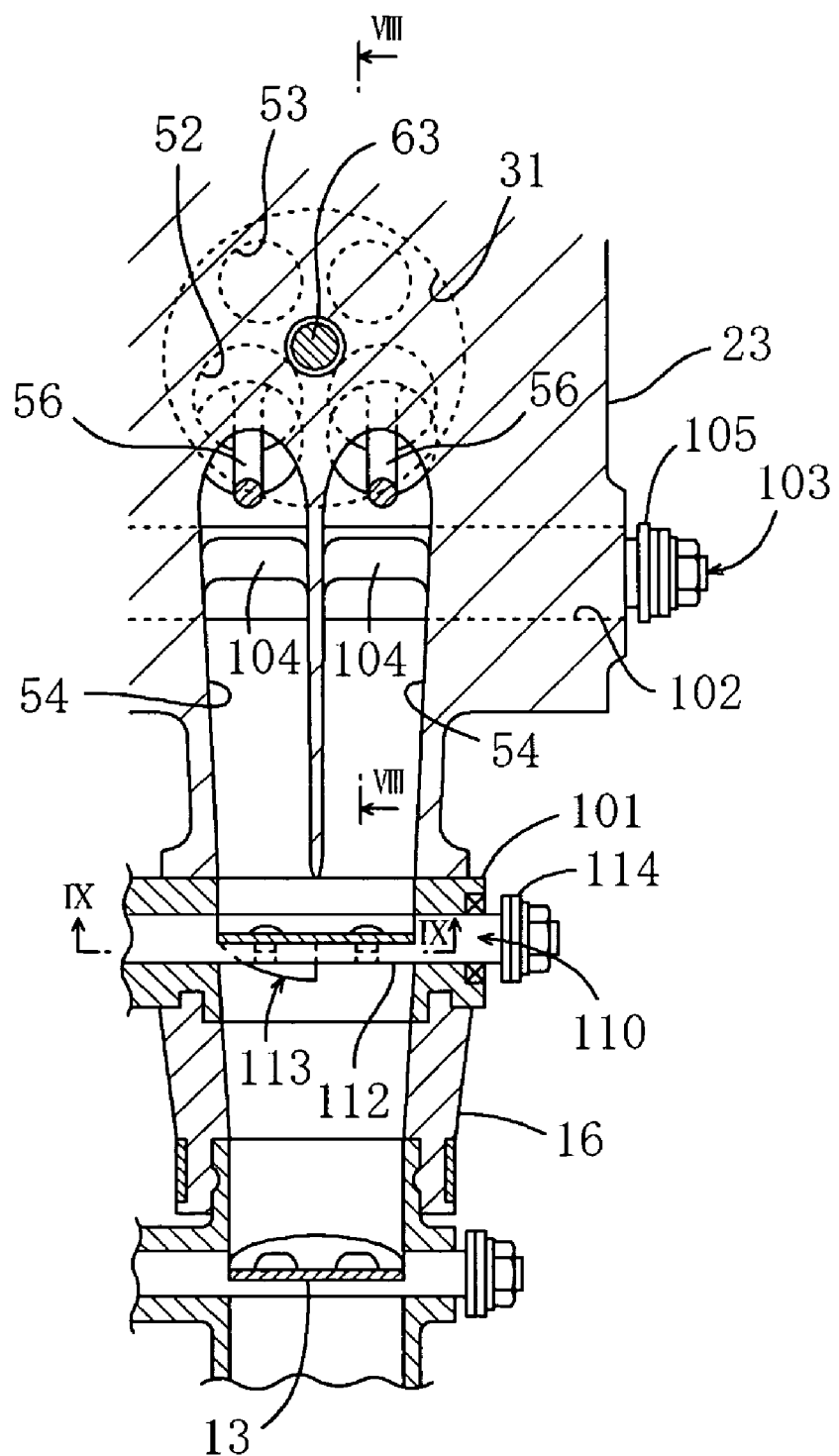
FIG. 7 is a partial, cross sectional view showing an engine according to a modification.

Subsequently, a further preferred embodiment including a valve to have an air-fuel mixture drifting will be described with reference to FIGS. 7 to 9. As shown in FIG. 7, according to this preferred embodiment, another throttle body 101 is provided between a cylinder head 23 and a throttle body 16. The cylinder head 23 is formed with a hole 102 that extends in a direction that is perpendicular or substantially perpendicular to intake ports 54. A control valve 103 is rotatably disposed in the hole 102 so as to vary the flow passage area of the intake ports 54. A connection 105 is provided at a tip end of the control valve 103, to which a drive cable or the like is connected. The control valve 103 receives a drive force from the drive cable or the like to be rotated, thereby varying the flow passage area of the intake ports 54.

Figure 8:
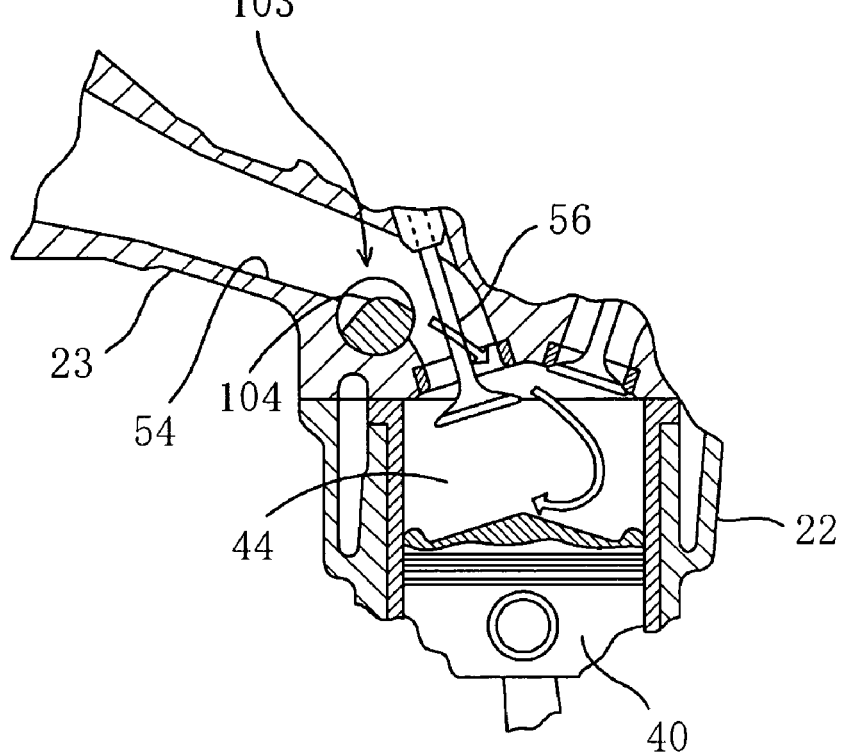
FIG. 8 is a cross sectional view taken along the line VIII—VIII in FIG. 7.

As shown in FIG. 8, recesses 104 are formed on those portions of the control valve 103, which are disposed in the intake ports 54. When the control valve 103 rotates, the recesses 104 change positions, so that the flow passage area of the intake ports 54 is varied. For example, when the control valve 103 rotates to partially close lower flow passage portions of the intake ports 54, only upper portions of the intake ports are opened to lead to a decrease in flow passage area. Thereby, the air-fuel mixture drifts toward a cylinder axis, so that tumble flows are liable to be formed in a combustion chamber 44.

As shown in FIG. 7, the throttle body 101 is provided with a throttle valve 110. The throttle valve 110 includes a valve shaft 112 that extends through the throttle body 101, a valve plate 113 bolted to the valve shaft 112, and a connection 114 provided at a tip end of the valve shaft 112. A drive cable or the like is connected to the connection 114, and the throttle body 101 receives a drive force from the drive cable or the like to be turned.

Figure 9:
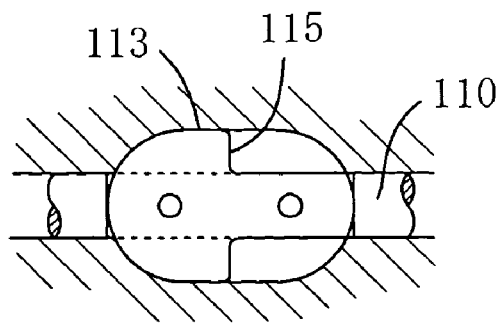
FIG. 9 is a cross sectional view taken along the line IX—IX in FIG. 7.

As shown in FIG. 9, that portion of the valve plate 113, which corresponds to one of the intake ports 54, is formed with a notch 115. Therefore, when the throttle valve 110 is turned, switching is performed between an opened state, in which both intake ports 54 are opened, and a closed state (a state shown in FIG. 9), in which one of the intake ports 54 is opened and the other is closed. In the closed state, the air-fuel mixture flows into the combustion chamber 44 only through one of intake openings 52, so that swirl flows are formed in the combustion chamber 44.

In addition, according to the present preferred embodiment, the control valve 103 and the throttle valve 110 may generate tumble flows or swirl flows singly in the combustion chamber 44, and can also generate vortex flows, in which tumble flows and swirl flows mix with each other.

According to the present preferred embodiment, the intake openings 52 and the exhaust openings 53, respectively, are preferably arranged two by two. However, the intake openings 52 and the exhaust openings 53 are not limited in number or arrangement. Also, the intake openings 52 and the exhaust openings 53 may be different in number from each other. Likewise, the intake valves 56 and the exhaust valves 57 are not limited in number or arrangement.

The present invention is not limited to the preferred embodiments described above, but various variations and modifications may be made without departing from the scope of the present invention. The presently disclosed preferred embodiments are therefore considered in all respects to be illustrative and not restrictive. The scope of the present invention is indicated by the appended claims rather than the foregoing description, and all changes which come within the meaning and range of equivalence thereof are intended to be embraced therein.

What is claimed is:

1. An internal combustion engine comprising:
   a cylinder having a cylinder inner surface;
   a cylinder head that cooperates with the cylinder inner surface to define a combustion chamber and has a head inner surface including an intake opening through which an intake gas is introduced into the combustion chamber;
   an intake valve that opens and closes the intake opening;
   an ignition plug provided on the cylinder head; and
   an intake drifting mechanism that causes the intake gas to drift toward an axis of the cylinder in the intake opening and generates a vortex flow in the combustion chamber; wherein
   when the intake valve is opened, a minimum gap between the intake valve and the head inner surface is equal to or larger than a gap between the intake valve and the cylinder inner surface in a diametrical direction of the cylinder, and the minimum gap between the intake valve and the head inner surface in the vicinity of the cylinder inner surface is smaller than other portions of the gap between the intake valve and the head inner surface.

2. The internal combustion engine according to claim 1, wherein the ignition plug is arranged at a position within about 5% of a bore diameter of the cylinder from the axis of the cylinder.

3. The internal combustion engine according to claim 1, wherein the ignition plug is arranged at a position within about 3% of a bore diameter of the cylinder from the axis of the cylinder.

4. The internal combustion engine according to claim 1, wherein the head inner surface includes an exhaust opening through which gases in the combustion chamber are discharged, and the ignition plug is offset toward the exhaust opening from the axis of the cylinder.

5. The internal combustion engine according to claim 1, wherein the intake drifting mechanism includes a tumble port that generates a vertical vortex flow in the combustion chamber.

6. A vehicle comprising:
a vehicle body;
a wheel mounted to the vehicle body; and
an internal combustion engine that drives the wheel, wherein the internal combustion engine includes:
a cylinder having a cylinder inner surface;
a cylinder head that cooperates with the cylinder inner surface to define a combustion chamber and has a head inner surface including an intake opening through which an intake gas is introduced into the combustion chamber;
an intake valve that opens and closes the intake opening;
an ignition plug provided on the cylinder head; and
an intake drifting mechanism that causes the intake gas to drift toward an axis of the cylinder in the intake opening and generates a vortex flow in the combustion chamber; wherein
when the intake valve is opened, a minimum gap between the intake valve and the head inner surface is equal to or larger than a gap between the intake valve and the cylinder inner surface in a diametrical direction of the cylinder, and the minimum gap between the intake valve and the head inner surface in the vicinity of the cylinder inner surface is smaller than other portions of the gap between the intake valve and the head inner surface.

7. The vehicle according to claim 6, wherein the ignition plug is arranged at a position within about 3% of a bore diameter of the cylinder from the axis of the cylinder.

8. The vehicle according to claim 6, wherein the head inner surface includes an exhaust opening through which gases in the combustion chamber are discharged, and the ignition plug is offset toward the exhaust opening from the axis of the cylinder.

9. The vehicle according to claim 6, wherein the intake drifting mechanism includes a tumble port that generates a vertical vortex flow in the combustion chamber.

10. The vehicle according to claim 6, wherein
the ignition plug is arranged at a position within about 5% of a bore diameter of the cylinder from the axis of the cylinder.

* * * * *